United States Patent
Roh

(10) Patent No.: US 11,659,190 B2
(45) Date of Patent: May 23, 2023

(54) METHOD OF OPERATING SEMICONDUCTOR DEVICE AND SEMICONDUCTOR SYSTEM

(71) Applicant: SAMSUNG ELECTRONICS CO., LTD., Suwon-si (KR)

(72) Inventor: Sung-Ho Roh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 698 days.

(21) Appl. No.: 15/349,342

(22) Filed: Nov. 11, 2016

(65) Prior Publication Data

US 2017/0142421 A1  May 18, 2017

(30) Foreign Application Priority Data

Nov. 12, 2015 (KR) .................. 10-2015-0158709

(51) Int. Cl.
*H04N 19/159* (2014.01)
*H04N 19/423* (2014.01)
(Continued)

(52) U.S. Cl.
CPC ........... *H04N 19/159* (2014.11); *H04N 19/15* (2014.11); *H04N 19/172* (2014.11);
(Continued)

(58) Field of Classification Search
None
See application file for complete search history.

(56) References Cited

U.S. PATENT DOCUMENTS 6,154,603 A * 11/2000 Willis .................. G11B 27/005
                                                      375/E7.094
7,343,083 B2   3/2008 Mishima et al.
(Continued)

FOREIGN PATENT DOCUMENTS

CN         104604226        5/2015
JP         2010135863       6/2010
(Continued)

OTHER PUBLICATIONS

CN 1st Office Action dated Apr. 6, 2021 in corresponding patent application CN 201610986894.5.

*Primary Examiner* — Mikhail Itskovich
(74) *Attorney, Agent, or Firm* — F. Chau & Associates, LLC

(57) ABSTRACT

A method of operating a semiconductor device includes receiving a video stream including a plurality of frames encoded in a hierarchical manner. Each frame is classified as one of a plurality of layers, and the plurality of layers includes a first layer and a second layer. The method further includes decoding the frames classified as the first layer in a chronological order, storing the decoded frames classified as the first layer in a decoded picture buffer (DPB), decoding a latest one of the frames classified as the second layer, storing the decoded latest one of the frames classified as the second layer in the DPB, reading the DPB to display the latest one of the frames classified as the second layer, and decoding and displaying the frames classified as the second layer other than the latest one of the frames classified as the second layer in a reverse chronological order.

20 Claims, 13 Drawing Sheets

(51) Int. Cl.
*H04N 19/30* (2014.01)
*H04N 19/15* (2014.01)
*H04N 19/172* (2014.01)
*H04N 19/177* (2014.01)
*H04N 19/187* (2014.01)

(52) U.S. Cl.
CPC ......... *H04N 19/177* (2014.11); *H04N 19/187* (2014.11); *H04N 19/30* (2014.11); *H04N 19/423* (2014.11)

(56) References Cited

U.S. PATENT DOCUMENTS

| | | | |
|---|---|---|---|
| 8,498,520 B2 | 7/2013 | Pejhan | |
| 2001/0005398 A1* | 6/2001 | Kono | H04N 19/176 375/240.25 |
| 2009/0279614 A1 | 11/2009 | Kim et al. | |
| 2010/0142615 A1 | 6/2010 | Han | |
| 2013/0215975 A1 | 8/2013 | Samuelsson et al. | |
| 2014/0185681 A1* | 7/2014 | Kwon | H04N 19/31 375/240.16 |
| 2015/0016804 A1 | 1/2015 | Biderman et al. | |
| 2015/0195582 A1 | 7/2015 | Moriya et al. | |

FOREIGN PATENT DOCUMENTS

| | | |
|---|---|---|
| KR | 1020120110609 | 10/2012 |
| WO | 2008126530 | 10/2008 |

\* cited by examiner

| DPB | s0 | s1 | s2 | s3 | s4 | s5 | s6 | s7 | s8 | s9 | s10 | s11 | s12 |
|---|---|---|---|---|---|---|---|---|---|---|---|---|---|
| 0 | I | I | I | I | I | I | I | I | I | I | I | I | ✕ |
| 1 | • | P2 | P2 | P2 | P2 | P2 | P2 | P2 | P2 | P2 | P2 | P2 | P2 |
| 2 | • | • | P4 | P4 | P4 | P4 | P4 | P4 | P4 | P4 | P4 | P4 | P4 |
| 3 | • | • | • | P6 | P6 | P6 | P3 | P3 | P3 | P3 | P3 | P3 | P3 |
| 4 | • | • | • | • | P7 | P5 | P5 | P1 | P1 | P1 | P1 | P1 | P1 |
| 5 | • | • | • | • | P7 | P6 | P5 | P4 | P3 | P2 | P1 | I | • |

Decoding Finished

Display Finished

- • invalid
- _ decoded
- ✕ displayed

| DPB | s0 | s1 | s2 | s3 | s4 | s5 | s6 | s7 | s8 | s9 | s10 | s11 |
|---|---|---|---|---|---|---|---|---|---|---|---|---|
| 0 | I | I | I | I | I | I | I | I | I | I | I | ✗ |
| 1 | • | P4 | P4 | P4 | P4 | P4 | P1 | P1 | P1 | ✗ | ✗ |
| 2 | • | • | P6 | P6 | P6 | P2 | P2 | P2 | ✗ | ✗ | ✗ | ✗ |
| 3 | • | • | • | P7 | P5 | P5 | P3 | P3 | P3 | ✗ | ✗ | ✗ |
| 4 | • | • | • | P7 | P6 | P5 | P4 | P3 | P2 | P1 | I | • |

Decoding Finished

Display Finished

- • invalid
- — decoded
- ✗ displayed

| DPB | s0 | s1 | s2 | s3 | s4 | s5 | s6 | s7 | s8 | s9 | s10 |
|---|---|---|---|---|---|---|---|---|---|---|---|
| 0 | I | I | I | I | I | I | I | I | I | I | I |
| 1 | • | P8 | P8 | P8 | P8 | P8 | P8 | P8 | P8 | P8 | P8 |
| 2 | • | • | P12 | P12 | P12 | P12 | P12 | P12 | P9 | P9 | P9 |
| 3 | • | • | • | P14 | P14 | P14 | P10 | P10 | P10 | P10 | P6 |
| 4 | • | • | • | • | P15 | P13 | P13 | P11 | P11 | P4 | P4 |
| 5 | • | • | • | • | P15 | P14 | P13 | P12 | P11 | P10 | P9 | invalid
decoded
displayed

| DPB | s11 | s12 | s13 | s14 | s15 | s16 | s17 | s18 | s19 | s20 |
|---|---|---|---|---|---|---|---|---|---|---|
| 0 | I | I | I | I | I | I | I | I | I | ⊠ |
| 1 | P8 | P5 | P5 | P5 | P1 | P1 | P1 | P1 | P1 | P1 |
| 2 | P7 | P7 | P2 | P2 | P2 | P2 | P2 | P2 | P2 | P2 |
| 3 | P6 | P6 | P6 | P3 | P3 | P3 | P3 | P3 | P3 | P3 |
| 4 | P4 | P4 | P4 | P4 | P4 | P4 | P4 | P4 | P4 | P4 |
| 5 | P8 | P7 | P6 | P5 | P4 | P3 | P2 | P1 | I | • |

Decoding Finished

Display Finished invalid
decoded
displayed

| DPB | s0 | s1 | s2 | s3 | s4 | s5 | s6 | s7 | s8 | s9 | s10 | s11 | s12 |
|---|---|---|---|---|---|---|---|---|---|---|---|---|---|
| 0 | I | I | I | I | I | I | I | I | I | I | I | I | I |
| 1 | · | P16 | P16 | P16 | P16 | P16 | P16 | P16 | P16 | P16 | P16 | P16 | P16 |
| 2 | · | · | P24 | P24 | P24 | P24 | P24 | P24 | P24 | P24 | P24 | P24 | P24 |
| 3 | · | · | · | P28 | P28 | P28 | P28 | P28 | P28 | P25 | P25 | P25 | P23 |
| 4 | · | · | · | · | P30 | P30 | P30 | P26 | P26 | P26 | P26 | P22 | P22 |
| 5 | · | · | · | · | · | P31 | P29 | P29 | P27 | P27 | P20 | P20 | P20 |
| 6 | · | · | · | · | · | P31 | P30 | P29 | P28 | P27 | P26 | P25 | P24 |

· invalid
− decoded
⊠ displayed

FIG. 11B

| DPB | s13 | s14 | s15 | s16 | s17 | s18 | s19 | s20 | s21 | s22 | s23 | s24 | s25 |
|---|---|---|---|---|---|---|---|---|---|---|---|---|---|
| 0 | I | I | I | I | I | I | I | I | I | I | I | I | I |
| 1 | P16 | P16 | P16 | P16 | P16 | P16 | P16 | P16 | P13 | P13 | P13 | P9 | P9 |
| 2 | P21 | P21 | P21 | P17 | P17 | P17 | P17 | P15 | P15 | P10 | P10 | P10 | P10 |
| 3 | P23 | P18 | P18 | P18 | P18 | P18 | P14 | P14 | P14 | P14 | P11 | P11 | P11 |
| 4 | P22 | P22 | P19 | P19 | P19 | P12 | P12 | P12 | P12 | P12 | P12 | P12 | P4 |
| 5 | P20 | P20 | P20 | P20 | P8 | P8 | P8 | P8 | P8 | P8 | P8 | P8 | P8 |
| 6 | P23 | P22 | P21 | P20 | P19 | P18 | P17 | P16 | P15 | P14 | P13 | P12 | P11 |

- • invalid
- — decoded
- ⊠ displayed

FIG. 11C

| DPB | s26 | s27 | s28 | s29 | s30 | s31 | s32 | s33 | s34 | s35 | s36 | s37 |
|---|---|---|---|---|---|---|---|---|---|---|---|---|
| 0 | I | I | I | I | I | I | I | I | I | I | I | ⊠ |
| 1 | P9 | P9 | P5 | P5 | P5 | P5 | P5 | P5 | P5 | P5 | P5 | P5 |
| 2 | P10 | P7 | P7 | P7 | P3 | P3 | P3 | P3 | P3 | P3 | P3 | P3 |
| 3 | P6 | P6 | P6 | P6 | P6 | P1 | P1 | P1 | P1 | P1 | P1 | P1 |
| 4 | P4 | P4 | P4 | P4 | P4 | P4 | P4 | P4 | P4 | P4 | P4 | P4 |
| 5 | P8 | P8 | P8 | P2 | P2 | P2 | P2 | P2 | P2 | P2 | P2 | P2 |
| 6 | P10 | P9 | P8 | P7 | P6 | P5 | P4 | P3 | P2 | P1 | I | • |

Decoding Finished (at s31)
Display Finished (at s37)

- • invalid
- — decoded
- ⊠ displayed

1200

1300

1400

METHOD OF OPERATING SEMICONDUCTOR DEVICE AND SEMICONDUCTOR SYSTEM

CROSS-REFERENCE TO RELATED APPLICATIONS

This application claims priority under 35 U.S.C. § 119 to Korean Patent Application No. 10-2015-0158709 filed on Nov. 12, 2015, the disclosure of which is incorporated by reference herein in its entirety.

TECHNICAL FIELD

Example embodiments of the present disclosure relate to a method of operating a semiconductor device and a semiconductor system.

DISCUSSION OF THE RELATED ART

An encoded digital video stream may include a plurality of groups of pictures (GOPs), each of which includes one or more video frames. Typically, random access is possible among GOPs, whereas sequential access is performed among video frames. Since sequential access takes longer than random access when searching, video frames of a video stream may be encoded in a hierarchical manner.

SUMMARY

Example embodiments of the present disclosure provide a method of operating a semiconductor device by which decoding and reverse playback on a video stream encoded in a hierarchical manner can be performed efficiently.

Example embodiments of the present disclosure also provide a computer-readable storage medium by which decoding and reverse playback on a video stream encoded in a hierarchical manner can be performed efficiently.

Example embodiments of the present disclosure also provide a semiconductor system capable of performing decoding and reverse playback on a video stream encoded in a hierarchical manner efficiently.

According to an example embodiment of the present disclosure, a method of operating a semiconductor device includes receiving a video stream including a plurality of frames encoded in a hierarchical manner. Each of the frames is classified as one of a plurality of layers, and the plurality of layers includes a first layer and a second layer. The method further includes decoding the frames classified as the first layer in a chronological order, storing the decoded frames classified as the first layer in a decoded picture buffer (DPB), decoding a latest one of the frames classified as the second layer, storing the decoded latest one of the frames classified as the second layer in the DPB, reading the DPB to display the latest one of the frames classified as the second layer, and decoding and displaying the frames classified as the second layer other than the latest one of the frames classified as the second layer in a reverse chronological order.

According to an example embodiment of the present disclosure, a method of operating a semiconductor device includes receiving a video stream including a plurality of groups of pictures (GOPs) encoded in a hierarchical manner, storing the video stream in a first memory area, and retrieving a first GOP that is a latest one of the plurality of GOPs from the video stream stored in the first memory area. The first GOP includes a plurality of frames, each of the frames is classified as one of a plurality of layers, and the plurality of layers includes a first layer and a second layer. The method further includes decoding the frames classified as the first layer in a chronological order, storing the decoded frames classified as the first layer in a second memory area, decoding a latest one of the frames classified as the second layer, storing the decoded latest one of the frames classified as the second layer in the second memory area, decoding the frames classified as the second layer other than the latest one of the frames classified as the second layer in a reverse chronological order, storing the decoded frames classified as the second layer other than the latest one of the frames classified as the second layer in the second memory area, and retrieving a second GOP that is a second latest one of the plurality of GOPs from the video stream stored in the first memory area.

According to an example embodiment of the present disclosure, a method of operating a semiconductor device includes receiving a video stream including a plurality of frames encoded in a hierarchical manner. Each of the frames is classified as one of a first layer, a second layer and a third layer. The method further includes decoding the frames classified as the first layer in a chronological order, storing the decoded frames classified as the first layer in a decoded picture buffer (DPB), decoding a latest one of the frames classified as the second layer, storing the decoded latest one of the frames classified as the second layer in the DPB, decoding a first frame that is a latest one of the frames classified as the third layer, storing the decoded first frame in the DPB, retrieving a second frame that is a second latest one of the frames classified as the third layer, determining whether a hierarchical parent frame of the second frame is stored in the DPB, decoding the second frame when the hierarchical parent frame is stored in the DPB, and decoding the hierarchical parent frame and subsequently decoding the second frame and storing the second frame in the DPB when the hierarchical parent frame is not stored in the DPB.

According to an example embodiment of the present disclosure, a computer-readable storage medium having program instructions stored thereon is provided. The program instructions are executable by a processor to cause the processor to receive a video stream including a plurality of frames encoded in a hierarchical manner. Each of the frames is classified as one of a plurality of layers, and the plurality of layers includes a first layer and a second layer. The program instructions further cause the processor to decode the frames classified as the first layer in a chronological order, store the decoded frames classified as the first layer in a decoded picture buffer (DPB), decode a latest one of the frames classified as the second layer, store the decoded latest one of the frames classified as the second layer in the DPB, read the DPB to display the latest one of the frames classified as the second layer, and decode and display the frames classified as the second layer other than the latest one of the frames classified as the second layer in a reverse chronological order.

According to an example embodiment of the present disclosure, a semiconductor system includes an input interface configured to receive a video stream including a plurality of frames encoded in a hierarchical manner. Each of the frames is classified as one of a plurality of layers, and the plurality of layers includes a first layer and a second layer. The semiconductor system further includes a first memory unit configured to store the plurality of frames, a decoder configured to decode the frames classified as the first layer in a chronological order, decode a latest one of the frames classified as the second layer, and decode the frames classified as the second layer other than the latest one of the frames classified as the second layer in a reverse chronological order, and a display device configured to receive and display decoded frames from the first memory unit.

According to an example embodiment of the present disclosure, a semiconductor system includes an input interface configured to receive a video stream including a plurality of groups of pictures (GOPs) encoded in a hierarchical manner, a first memory unit configured to store the video stream, and a decoder configured to retrieve a first GOP that is a latest one of the plurality of GOPs from the video stream stored in the first memory unit. The first GOP includes a plurality of frames, each of the frames is classified as one of a plurality of layers, and the plurality of layers comprises a first layer and a second layer. The decoder is further configured to decode the frames classified as the first layer in a chronological order, decode a latest one of the frames classified as the second layer, decode the frames classified as the second layer other than the latest one of the frames classified as the second layer in a reverse chronological order, and retrieve a second GOP that is a second latest one of the plurality of GOPs from the video stream stored in the first memory unit. The semiconductor system further includes a second memory unit configured to store the decoded frames classified as the first layer, store the decoded latest one of the frames classified as the second layer, and store the decoded frames classified as the second layer other than the latest one of the frames classified as the second layer.

BRIEF DESCRIPTION OF THE DRAWINGS

The above and other features of the present disclosure will become more apparent by describing in detail example embodiments thereof with reference to the accompanying drawings, in which:

FIGS. 11A to 11C are diagrams illustrating design schemes of the DPB that vary depending on the operations of the semiconductor device described above with reference to FIG. 10, according to example embodiments of the present disclosure.

DETAILED DESCRIPTION OF THE EXAMPLE EMBODIMENTS

Figure 1:
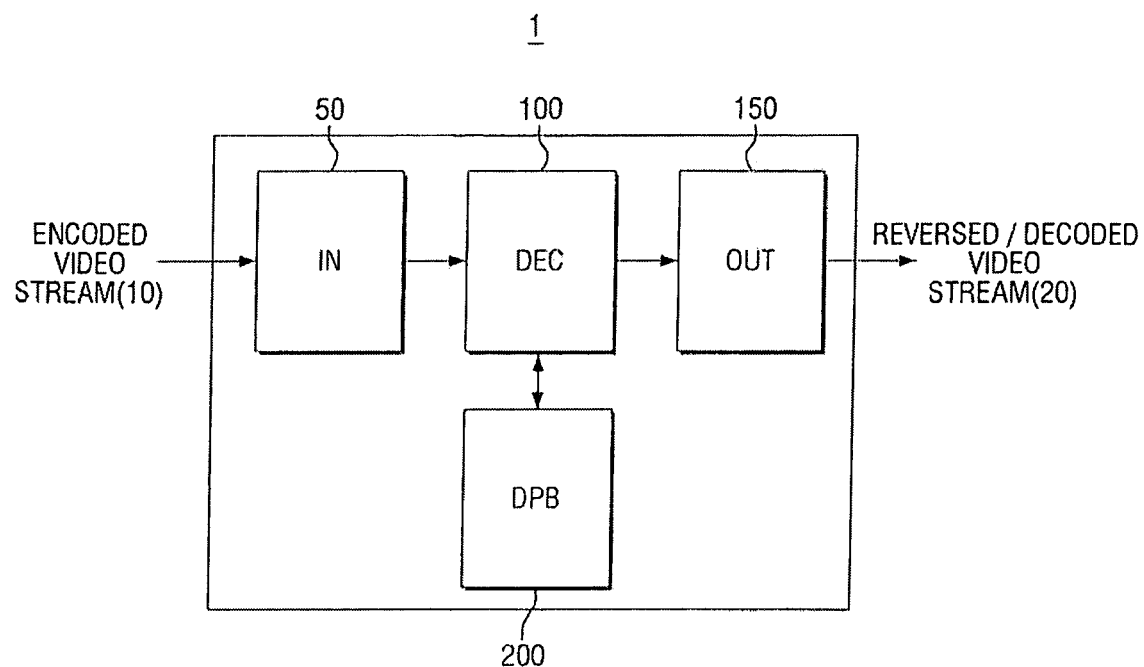
FIG. 1 is a block diagram schematically illustrating a semiconductor system according to an example embodiment of the present disclosure.

Example embodiments of the present disclosure will be described more fully hereinafter with reference to the accompanying drawings. In the drawings, the sizes and relative sizes of layers and regions may be exaggerated for clarity. Like reference numerals may refer to like elements throughout the accompanying drawings.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

As used herein, the singular forms "a", "an" and "the" are intended to include the plural forms as well, unless the context clearly indicates otherwise.

It will be understood that when an element or layer is referred to as being "on", "connected to", "coupled to", or "adjacent to" another element or layer, it can be directly on, connected, coupled, or adjacent to the other element or layer, or intervening elements or layers may be present.

As is traditional in the field of the inventive concept, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concept. Further, the blocks, units and/or modules of the example embodiments may be physically combined into more complex blocks, units and/or modules without departing from the scope of the inventive concept.

It is to be understood that the present inventive concept may be implemented in various forms of hardware, software, firmware, special purpose processors, or a combination thereof. In one embodiment, the present inventive concept may be implemented in software as program instructions tangibly embodied on a computer-readable storage medium. The program instructions may be executable by a processor to cause the processor to perform operations according to example embodiments of the present disclosure.

Example embodiments of the present disclosure provide a semiconductor system capable of efficiently decoding video frames encoded in a hierarchical manner at the time of reverse playback of an encoded video stream, and allowing for reverse playback on a display device.

FIG. 1 is a block diagram schematically illustrating a semiconductor system according to an example embodiment of the present disclosure.

Referring to FIG. 1, a semiconductor system 1 according to an example embodiment of the present disclosure may include an input unit 50 (e.g., an input circuit 50), a decoder 100, an output unit 150 (e.g., an output circuit 150) and a decoded picture buffer (DPB) 200.

The input unit 50 is, for example, an input interface that receives an encoded video stream 10. The input unit 50 provides the encoded video stream 10 to the decoder 100. In example embodiments, the input unit 50 may include a buffer for storing (e.g., temporarily storing) at least a part of the encoded video stream 10. The input unit 50 may divide the encoded video stream 10 into segments called, for example, groups of pictures (GOPs), and may provide the GOPs to the decoder 100. Thus, the encoded video stream 10 may include a plurality of groups of pictures (GOPs), each of which may include a predetermined number of frames.

In this example embodiment, the encoded video stream 10 includes a video stream that includes a plurality of frames encoded in a hierarchical manner. Encoding a plurality of frames in a hierarchical manner will be described briefly herein. Some of a plurality of frames contained in a video stream that are firstly encoded are designated as parent frames (also referred to herein as reference frames). Some other frames that are encoded subsequently according to the hierarchical structure are designated as child frames. The parent/reference frames and the child frames form a hierarchical tree structure, in which child frames are linked to the respective parent frames on the same level. The encoding order is determined according to the hierarchical structure.

For example, if a video stream contains eight frames F0 to F7 arranged in chronological order, sequential encoding refers to encoding the frames in order from frame F0 to frame F7. In contrast, in an example in which encoding is performed in a hierarchical manner, the frame F0 is designated as a parent/reference frame of the frames F1 to F3, and the frame F4 is designated as a parent/reference frame of the frames F5 to F7. The frames F0 and F4 are designated as the same level (e.g., a first level). Hereinafter, the first level may also be referred to as a first hierarchical layer or a first layer.

Subsequently, the frame F2 is designated as a parent/reference frame of the frames F1 and F3, and the frame F6 is designated as a parent/reference frame of the frames F5 and F7. The frames F2 and F6 are designated as the same level (e.g., a second level). Hereinafter, the second level may also be referred to as a second hierarchical layer or a second layer.

Accordingly, frames F1, F3, F5 and F7 are designated as the same level (e.g., a third level). Hereinafter, the third level may also be referred to as a third hierarchical layer or a third layer. Encoding performed on the frames in each of the layers according to the hierarchical structure is referred to as hierarchical encoding.

The decoder 100 decodes the encoded video stream 10 received from the input unit 50. For example, the decoder 100 decodes a plurality of frames included in the encoded video stream 10 received from the input unit 50. In example embodiments, the plurality of frames may include at least one of, for example, intra frames (I-frames), predicted frames (P-frames) and bidirectional prediction frames (B-frames).

Each of the plurality of frames is classified as one of the plurality of layers described above. For example, some of the plurality of frames may be classified as the first layer, and others of the plurality of frames may be classified as the second layer. The number of the plurality of layers may be determined when the plurality of frame is encoded in a hierarchical manner as described above. Although the example described above includes three layers, the number of layers according to example embodiments of the present disclosure is not limited thereto.

The decoder 100 initially decodes the frames classified as the first layer L1 from among the plurality of frames in chronological order, and stores these decoded frames in the DPB 200, as described below. Subsequently, the decoder 100 decodes the latest one of the frames classified as the second layer L2 and stores this decoded frame in the DPB 200. Subsequently, the decoder 100 decodes the rest of the frames classified as the second layer L2 that are not decoded yet while traversing the frames in the above-described hierarchical structure in reverse chronological order. In an example, assume that frames A, B and C are classified as the first layer L1, and frames D, E, F and G are classified as the second layer L2. In an example embodiment, the decoder 100 initially decodes frames A, B and C in chronological order (e.g., the decoder 100 decodes frame A, then decodes frame B, then decodes frame C), and stores decoded frames A, B and C in the DPB 200. Subsequently, the decoder 100 decodes frame G (e.g., the latest one of the frames classified as the second layer L2), and stores decoded frame G in the DPB 200. Subsequently, the decoder 100 decodes the rest of the frames classified as the second layer L2 that are not yet decoded (e.g., frames D, E and F) in reverse chronological order (e.g., the decoder 100 decodes frame F, then decodes frame E, then decodes frame D).

In addition, the decoder 100 reads the DPB 200 to retrieve a previous frame that is the second latest one of the frames classified as the second layer, and determines whether the hierarchical parent frame of the previous frame is stored in the DPB 200. If the hierarchical parent frame of the previous frame is stored in the DPB 200, the previous frame is immediately decoded (e.g., the previous frame is decoded before any other frames). Alternatively, if the hierarchical parent frame of the previous frame is not stored in the DPB 200, the hierarchical parent frame is decoded first and then the previous frame is decoded.

A detailed description of the operations of the decoder 100 will be made below with reference to various example embodiments.

The output unit 150 outputs a plurality of frames decoded by the decoder 100. In example embodiments, the output unit 150 may output the plurality of frames decoded by the decoder 100 in reverse chronological order. Thus, the output unit 150 outputs a reversed/decoded video stream 20. Accordingly, for example, the display device 300 shown in FIG. 2 may allow for reverse playback of the decoded video stream.

The DPB 200 stores (e.g., temporarily stores) the plurality of frames decoded by the decoder 100. In example embodiments, the DPB 200 may include a plurality of unit buffer blocks (e.g., buffer circuits). Each unit buffer block corresponds to information on a respective frame. For example, when the DPB 200 has a size of five, the DPB 200 may store five decoded frames. After decoding the plurality of frames in the above-described order, the decoder 100 stores the decoded frames in the DPB 200. In addition, the display device 300 may read the DPB 200 to display the decoded frames.

In example embodiments, the number of unit buffer blocks required for the operations of a semiconductor device may be determined by Equation 1 below:

$$NB = NG/2^{(NL-1)} + NL \quad (1)$$

where NB denotes the number of unit buffer blocks, NG denotes the number of the plurality of frames, and NL denotes the number of the layers.

In example embodiments, a display delay taken for decoding a frame until the semiconductor device begins a display operation may be determined by Equation 2 below:

$$DD = NG/2^{(NL-1)} + NL - 1 \quad (2)$$

where DD denotes the display delay, NG denotes the number of the plurality of frames, and NL denotes the number of the layers.

For example, if the NG is 32 (e.g., a GOP includes 32 frames), the NB and DD may be determined as follows depending on the number of layers:

TABLE 1

| | Number of Layers | | | |
|---|---|---|---|---|
| | 2 | 3 | 4 | 5 |
| NB | 18 | 11 | 8 | 7 |
| DD | 17 | 10 | 7 | 6 |

In a comparative example, when the NG is 32, 33 unit buffer blocks are required, and the display delay has a value of 32. In contrast, in a method of operating a semiconductor device and a semiconductor system according to example embodiments of the present disclosure, when the number of the layers is three or more, the size of the DPB 200 and the display delay may be reduced to about one-third compared to the comparative example.

Figure 2:
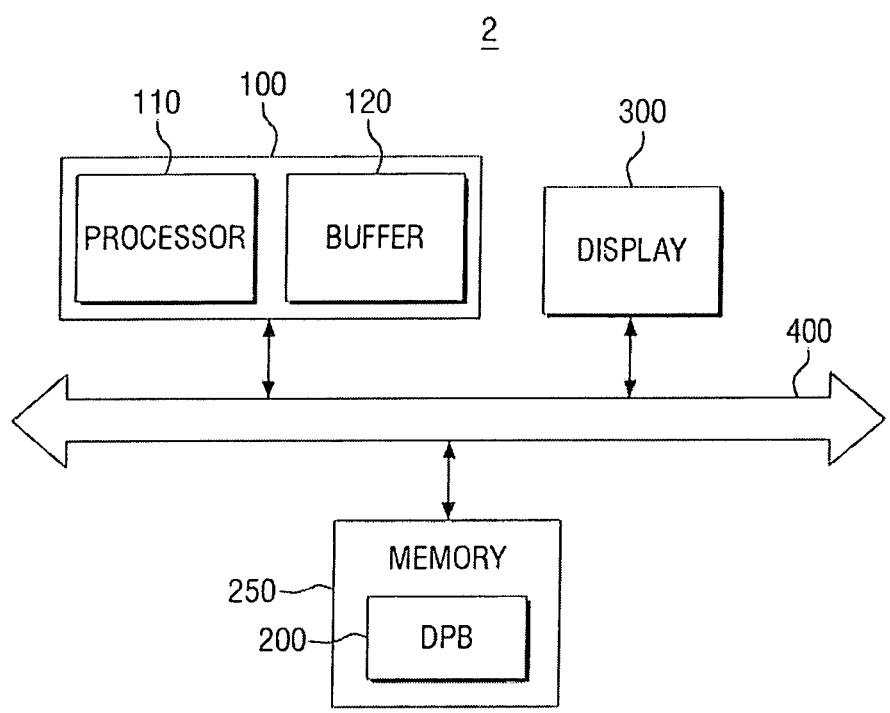
FIG. 2 is a block diagram schematically illustrating a semiconductor system according to an example embodiment of the present disclosure.

FIG. 2 is a block diagram schematically illustrating a semiconductor system according to an example embodiment of the present disclosure.

Referring to FIG. 2, a semiconductor system 2 according to an example embodiment of the present disclosure may include a decoder 100, a memory 250 and a display device 300. The decoder 100, the memory 250 and the display device 300 may send/receive data to/from one another via a bus 400.

The decoder 100 may include a processor 110 and a buffer 120 disposed therein. The processor executes one or more instructions that cause the decoder 100 to perform the operations described above with respect to FIG. 1. In example embodiments, the processor 110 may be, but is not limited to, a processor such as a central processing unit (CPU), a graphic processing unit (GPU), etc., or may be an integrated circuit such as, but not limited to, an application specific integrated circuit (ASIC), a field programmable gate array (FPGA), etc.

The buffer 120 is storage space for storing (e.g., temporarily storing) data while the processor 110 executes the instructions. For example, the processor 110 may store (e.g., temporarily store) a part of the encoded video stream 10 while decoding it.

The memory 250 may be a volatile memory such as, for example, a dynamic random access memory (DRAM) or a static random access memory (SRAM). However, the memory 250 is not limited thereto. For example, the memory 250 may be implemented as a non-volatile memory such as a flash memory. In example embodiments, the DPB 200 described above with respect to FIG. 1 may be implemented in the memory 250. That is, the DPB 200 according to example embodiments of the present disclosure may be disposed within the memory 250.

The display device 300 receives a decoded video stream from the DPB 200 and displays the decoded video stream. In example embodiments, the display device 300 may be implemented as, but is not limited to, a cathode ray tube (CRT) display, a liquid crystal display (LCD), a light-emitting diode (LED) display, etc.

Figure 3:
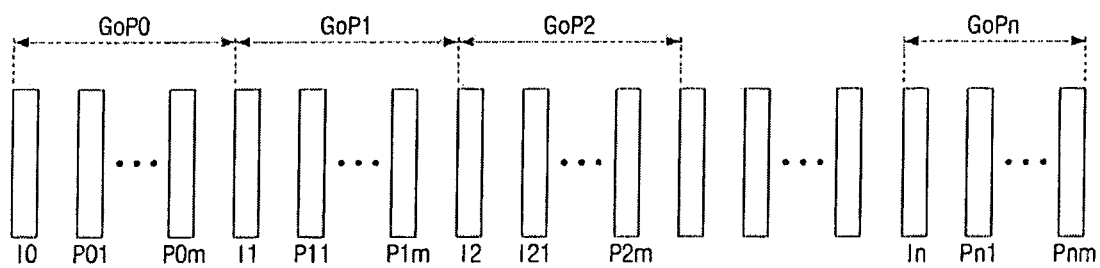
FIG. 3 is a diagram schematically illustrating an encoded video stream used in various example embodiments of the present disclosure.

FIG. 3 is a diagram schematically illustrating an encoded video stream used in various example embodiments of the present disclosure.

Referring to FIG. 3, an encoded video stream 10 may include a plurality of GOPs (e.g., GOP0, GOP1, . . . , GOPn, in which n is an integer equal to at least two). Each of the GOPs may include a plurality of video frames. For example, GOP0 may include frames I0, P01, . . . , P0m, GOP1 may include frames I1, P11, . . . , P1m, GOP2 may include frames I2, I21, . . . , P2m, and GOPn may include frames In, Pn1, . . . , Pnm.

Since the GOPs include their own intra frames I0, I1, . . . , In, random access to the GOPs is possible in example embodiments by utilizing the intra frames as identification information. However, random access to the plurality of frames included in the GOPs may not be possible.

According to example embodiments of the present disclosure, the decoder 100 receives the video stream 10 including a plurality of GOPs encoded in a hierarchical manner, stores the video stream 10 in a first memory area (e.g., the buffer 120), and retrieves a first GOP that is the latest one from among the plurality of GOPs of the video stream 10 stored in the first memory area (e.g., GOPn).

After performing the operations described above with reference to FIG. 1 on the first GOP to complete decoding, the decoder 100 retrieves the second GOP that is the second latest one from among the plurality of GOPs of the video stream 10 stored in the first memory area (e.g., GOP(n−1)), and performs decoding on it.

The decoder 100 may perform decoding on the rest of the GOPs in this manner until GOP0 is decoded. Accordingly, the plurality of GOPs is displayed in reverse chronological order. Thus, the plurality of frames in each of the GOPs is also display in reverse chronological order.

For example, according to example embodiments of the present disclosure, in the method of operating a semiconductor device and a semiconductor system, at least some of the plurality of frames in the first GOP may be displayed before all of the frames in the first GOP are decoded. A detailed description thereof will be made below with reference to various example embodiments.

Figures 4, 5:
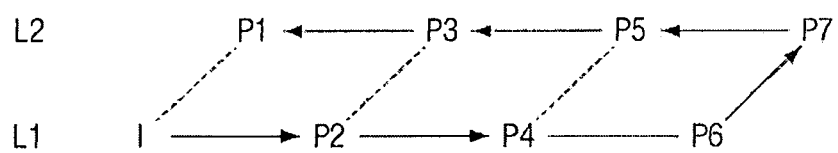
FIG. 4 is a view schematically illustrating an example operation of a semiconductor device according to an example embodiment of the present disclosure.
FIG. 5 is a diagram illustrating a design scheme of the decoded picture buffer (DPB) that varies depending on the operations of the semiconductor device described above with reference to FIG. 4, according to an example embodiment of the present disclosure.

FIG. 4 is a view schematically illustrating an example operation of a semiconductor device according to an example embodiment of the present disclosure.

In the example shown in FIG. 4, a single GOP includes eight frames. Each of the eight frames encoded in the hierarchical manner is classified as one of the first layer L1 and the second layer L2, as shown in FIG. 4. In this example, the decoder 100 initially decodes the frames classified as the first layer L1 in chronological order and stores them in the DPB 200. For example, the decoder 100 initially decodes the frames I, P2, P4 and P6 classified as the first layer L1 sequentially and stores them in the DPB 200.

Subsequently, the decoder 100 decodes the latest one of the plurality of frames classified as the second layer L2 and stores this frame in the DPB 200. For example, the decoder 100 subsequently decodes the latest frame from among the frames classified as the second layer L2 (e.g., the frame P7) and stores it in the DPB 200.

Subsequently, the decoder 100 reads the DPB 200 to display the frame P7.

Subsequently, the decoder 100 sequentially decodes the rest of the frames classified as the second layer L2 that are not decoded yet while traversing the frames in reverse chronological order. For example, the decoder 100 sequentially decodes frames P5, P3 and P1.

FIG. 5 is a diagram illustrating a design scheme of the decoded picture buffer (DPB) that varies depending on the operations of the semiconductor device described above with reference to FIG. 4, according to an example embodiment of the present disclosure.

Referring to FIG. 5, the DPB 200 includes first buffer areas and a second buffer area. The first buffer areas store decoded frames of the plurality of frames, and the second buffer area stores frames for displaying from among the decoded frames. In FIG. 5, the first buffer areas are indexed with values from 0 to 4, respectively, and the second buffer area is indexed with the value of 5 in the DPB 200. For example, referring to column s4, the DPB 200 stores decoded frames I, P2, P4 and P6 in the first buffer areas, and a frame P7 for displaying in the second buffer area.

In the tables illustrating a design scheme of the DPB 200 shown in FIG. 5 and other similar tables illustrated herein, the underlined number of a frame indicates that the frame is decoded at that step. In addition, the number of a frame marked with cross lines (e.g., marked with an 'X') indicates that the frame has been displayed. A block having a dot therein refers to invalid data (e.g., a trash value).

Referring to FIGS. 4 and 5, the decoder 100 decodes the frames I, P2, P4 and P6 classified as the first layer L1 in this order, and stores them in the blocks indexed by 0 to 4, respectively, in the DPB 200 (e.g., steps s0 to s3).

Subsequently, the decoder 100 decodes the latest one of the frames classified as the second layer L2 (e.g., the frame P7), and stores this frame in the block indexed by 5 in the DPB 200 to display the frame P7 (e.g., step s4).

Subsequently, the decoder 100 sequentially decodes the rest of the frames P5, P3 and P1 classified as the second layer L2 which are not decoded yet, and overwrites the frames already displayed in the DPB 200 with the rest of the frames. For example, the frame P7 already displayed in step s4 is overwritten with the frame P5 in step s5, the frame P6 already displayed in step s5 is overwritten with the frame P3 in step s6, and the frame P5 already displayed in step s6 is overwritten with the frame P1 in step s7.

Accordingly, the decoding of the plurality of frames is finished by step s7, and the frames P3, P2, P1 and I, which are not yet displayed, are sequentially displayed from step s8 to step s11.

As can be seen from the foregoing description, according to example embodiments of the present disclosure, at the time of reverse playback of an encoded video stream, the size of the DPB 200 may be drastically reduced. In addition, at least some of the plurality of frames included in a GOP is displayed before all of the frames of the GOP are displayed, reducing display delay.

Figures 6, 7:
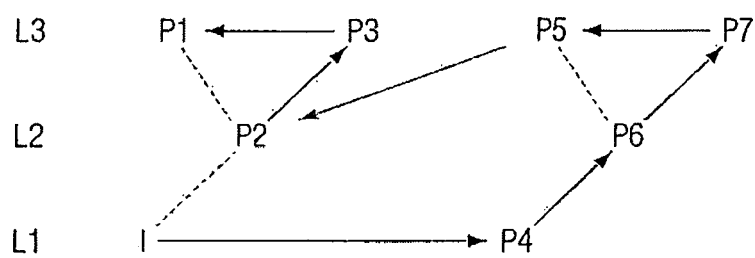
FIG. 6 is a view schematically illustrating an example operation of a semiconductor device according to an example embodiment of the present disclosure.
FIG. 7 is a diagram illustrating a design scheme of the decoded picture buffer (DPB) that varies depending on the operations of the semiconductor device described above with reference to FIG. 6, according to an example embodiment of the present disclosure.

FIG. 6 is a view schematically illustrating an example operation of a semiconductor device according to an example embodiment of the present disclosure.

In the example shown in FIG. 6, a single GOP includes eight frames. Each of the eight frames encoded in the hierarchical manner is classified as one of the first layer L1 to the third layer L3, as shown in FIG. 6. In this example, the decoder 100 initially decodes the frames classified as the first layer L1 in chronological order and stores them in the DPB 200. For example, the decoder 100 initially decodes the frames I and P4 classified as the first layer L1 sequentially and stores them in the DPB 200.

Subsequently, the decoder 100 decodes the latest one of the plurality of frames classified as each of the second layers L2 and the third layer L3, and stores these frames in the DPB 200. For example, the decoder 100 subsequently decodes the latest frame from among the frames classified as the second layer L2 (e.g., the frame P6) and stores this frame in the DPB 200. Subsequently, the decoder 100 decodes the latest frame from among the frames classified as the third layer L3 (e.g., the frame P7) and stores this frame in the DPB 200.

Subsequently, the decoder 100 reads the DPB 200 to display the frame P7.

Subsequently, the decoder 100 sequentially decodes the rest of the frames P5, P2, P3 and P1 classified as the second layer L2 and the third layer L3 that are not decoded yet while traversing in reverse chronological order.

In addition, the decoder 100 reads the DPB 200 to retrieve the previous frame P5 that is the second latest one of the frames classified as the third layer L3, and determines whether the hierarchical parent frame P6 of the previous frame P5 is stored in the DPB 200. In this example, the hierarchical parent frame P6 of the previous frame P5 is stored in the DPB 200. Thus, the previous frame P5 is immediately decoded (e.g., the previous frame P5 is decoded before any other frames).

Alternatively, if the decoder 100 reads the DPB 200 to retrieve the previous frame P3 that is earlier than the frame P5 of the frames classified as the third layer L3, the hierarchical parent frame P2 of the previous frame P3 is not stored in the DPB 200. Thus, the hierarchical parent frame P2 is decoded first and then the previous frame P3 is decoded.

FIG. 7 is a diagram illustrating a design scheme of the decoded picture buffer (DPB) that varies depending on the operations of the semiconductor device described above with reference to FIG. 6, according to an example embodiment of the present disclosure.

Referring to FIGS. 6 and 7, the decoder 100 decodes the frames I and P4 classified as the first layer L1 in this order, and stores these frames in the blocks indexed by 0 and 1, respectively, in the DPB 200 (steps s0 and s1).

Subsequently, the decoder 100 decodes the latest ones of the frames classified as the second layer L2 and the third layer L3, respectively (e.g., the frames P6 and P7), and stores these frames in the blocks indexed by 2 and 3, respectively, in the DPB 200 to display the frame P7 (steps s3 and s4).

Subsequently, the decoder 100 sequentially decodes the rest of the frames P5, P3 and P1 of the frames classified as the third layer L3 which are not decoded yet, and overwrites the frames already displayed in the DPB 200 with the rest of these frames. For example, the frame P7 already displayed in step s3 is overwritten with the frame P5 in step s4, the frame P6 already displayed in step s4 is overwritten with the frame P2 in step s5, the frame P5 already displayed in step s5 is overwritten with the frame P3 in step s6, and the frame P4 already displayed in step s6 is overwritten with the frame P1 in step s7.

Accordingly, decoding of the plurality of frames is finished by step s7, and the frames P2, P1 and I, which are not yet displayed, are sequentially displayed from step s8 to step s10.

As can be seen from the foregoing description, according to example embodiments of the present disclosure, at the time of reverse playback of an encoded video stream, the size of the DPB 200 may be drastically reduced. In addition, at least some of the plurality of frames included in a GOP is displayed before all of the frames of the GOP are displayed, reducing display delay.

Figure 8:
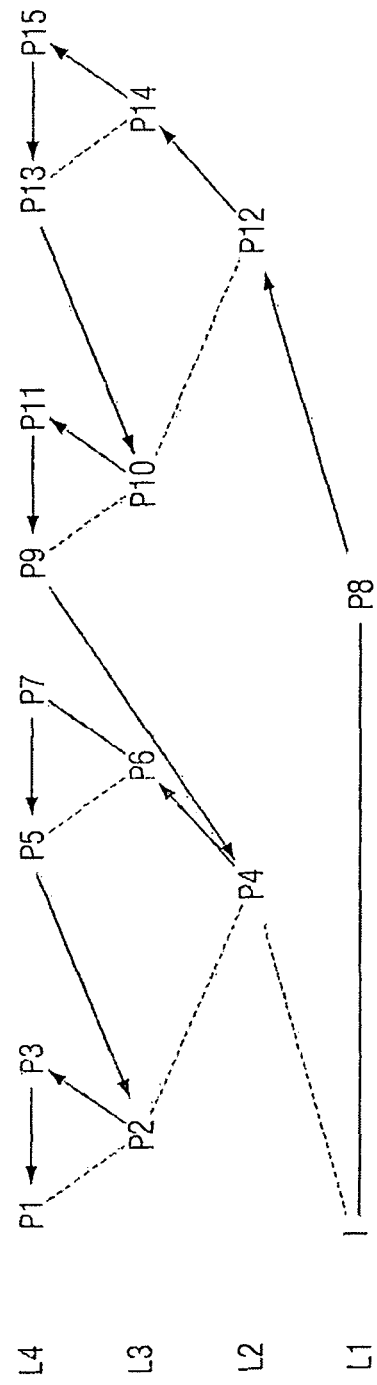
FIG. 8 is a view schematically illustrating an example operation of a semiconductor device according to an example embodiment of the present disclosure.
Figure 9A:
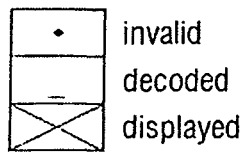
FIGS. 9A and 9B are diagrams illustrating design schemes of the DPB that vary depending on the operations of the semiconductor device described above with reference to FIG. 8, according to example embodiments of the present disclosure.
Figure 9B:
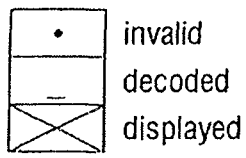

FIG. 8 is a view schematically illustrating an example operation of a semiconductor device according to an example embodiment of the present disclosure. FIGS. 9A and 9B are diagrams illustrating design schemes of the DPB that vary depending on the operations of the semiconductor device described above with reference to FIG. 8, according to example embodiments of the present disclosure.

In the example shown in FIGS. 8, 9A and 9B, a single GOP includes 16 frames. Each of the 16 frames encoded in the hierarchical manner is classified as one of the first layer L1 to the fourth layer L4, as shown in FIG. 8. In this example, the decoder 100 decodes the frames I and P8 classified as the first layer L1 sequentially, and stores them in the DPB 200.

Subsequently, the decoder 100 decodes the latest frames from among the frames classified as the second layer L2 to the fourth layer L4 (e.g., the frames P12, P14 and P15), respectively, and stores these frames in the DPB 200. Subsequently, the decoder 100 reads the DPB 200 to display the frame P15.

Subsequently, the decoder 100 sequentially decodes the rest of the frames from among the frames classified as the fourth layer L4 that are not decoded yet (e.g., the frames P13, P11, P9, P7, P5, P3 and P1) while traversing in reverse chronological order.

In addition, the decoder 100 reads the DPB 200 to retrieve the previous frame P13 that is the second latest one of the frames classified as the fourth layer L4, and determines whether the hierarchical parent frame P14 of the previous frame P13 is stored in the DPB 200. In this example, the hierarchical parent frame P14 of the previous frame P13 is stored in the DPB 200. Thus, the previous frame P13 is immediately decoded (e.g., the previous frame P13 is decoded before any other frames).

Alternatively, if the decoder 100 reads the DPB 200 to retrieve the previous frame P11 that is the third latest one of the frames classified as the fourth layer L4, the hierarchical parent frame P10 of the previous frame P11 is not stored in the DPB 200. Thus, the hierarchical parent frame P10 is decoded first and then the previous frame P11 is decoded.

Similarly, if the decoder 100 reads the DPB 200 to retrieve a previous frame P7 that is earlier than the frame P9 of the frames classified as the fourth layer L4, the hierarchical parent frames P4 and P6 (e.g., the grandparent frame P4 and a parent frame P6 of the previous frame P7) are not stored in the DPB 200. Thus, the hierarchical parent frames P4 and P6 are decoded first and then the previous frame P7 is decoded.

Figure 10:
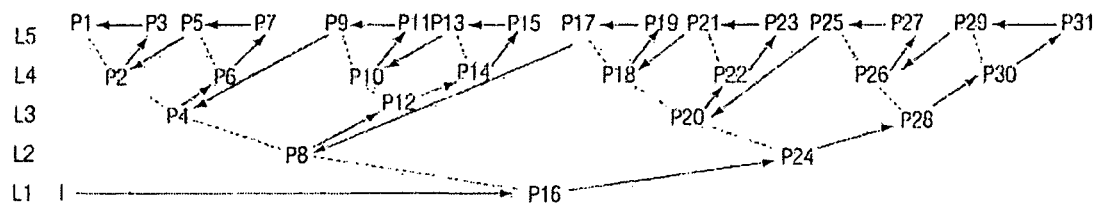
FIG. 10 is a view schematically illustrating an example operation of a semiconductor device according to an example embodiment of the present disclosure.
Figure 11A:
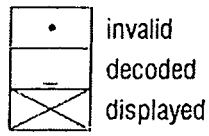

FIG. 10 is a view schematically illustrating an example operation of a semiconductor device according to an example embodiment of the present disclosure. FIGS. 11A to 11C are diagrams illustrating design schemes of the DPB that vary depending on the operations of the semiconductor device described above with reference to FIG. 10, according to example embodiments of the present disclosure.

In the example shown in FIGS. 10 and 11A to 11C, a single GOP includes 32 frames. Each of the 32 frames encoded in the hierarchical manner are classified as one of the first layer L1 to the fifth layer L5, as shown in FIG. 10. In this example, the decoder 100 decodes the frames I and P16 classified as the first layer L1 sequentially, and stores these frames in the DPB 200.

Subsequently, the decoder 100 decodes the latest frames from among the frames classified as the second layer L2 to the fifth layer L5 (e.g., the frames P24, P28, P30 and P31), respectively, and stores these frames in the DPB 200. Subsequently, the decoder 100 reads the DPB 200 to display the frame P31.

Subsequently, the decoder 100 sequentially decodes the rest of the frames from among the frames classified as the fifth layer L5 that are not decoded yet (e.g., the frames P29, P27, P25, P23, etc.) while traversing in reverse chronological order.

In addition, the decoder 100 reads the DPB 200 to retrieve the previous frame P29 that is the second latest one of the frames classified as the fifth layer L5, and determines whether the hierarchical parent frame P30 of the previous frame P31 is stored in the DPB 200. In this example, the hierarchical parent frame P30 of the previous frame P31 is stored in the DPB 200. Thus, the previous frame P31 is immediately decoded (e.g., the previous frame P31 is decoded before any other frames).

Alternatively, if the decoder 100 reads the DPB 200 to retrieve the previous frame P27 that is the third latest one of the frames classified as the fifth layer L5, the hierarchical parent frame P26 of the previous frame P27 is not stored in the DPB 200. Thus, the hierarchical parent frame P26 is decoded first, and then the previous frame P27 is decoded.

Similarly, if the decoder 100 reads the DPB 200 to retrieve the previous frame P23 that is the fifth latest one of the frames classified as the fifth layer L5, the hierarchical parent frames P20 and P22 (e.g., the grandparent frame P20 and a parent frame P22) of the previous frame P23 are not stored in the DPB 200. Thus, the hierarchical parent frames P20 and P22 are decoded first, and then the previous frame P23 is decoded.

Similarly, if the decoder 100 reads the DPB 200 to retrieve the previous frame P15 that is the ninth latest one of the frames classified as the fifth layer L5, the hierarchical parent frames P8, P12 and P14 of the previous frame P15 are not stored in the DPB 200. Thus, the hierarchical parent frames P8, P12 and P14 are decoded first in this order, and then the previous frame P15 is decoded.

Figure 12:
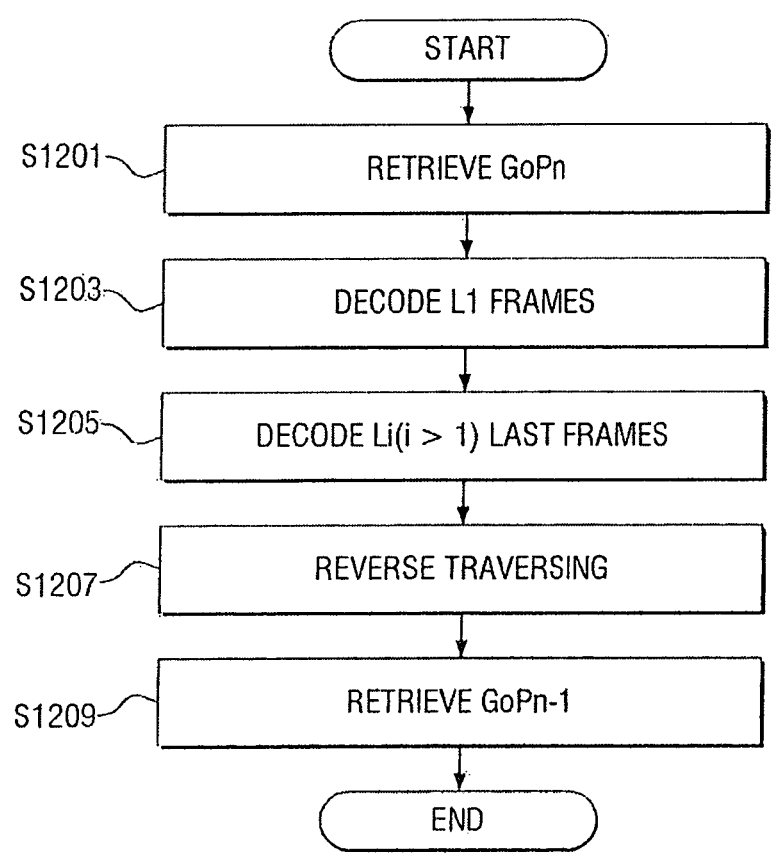
FIG. 12 is a flowchart illustrating a method of operating a semiconductor device according to an example embodiment of the present disclosure.

FIG. 12 is a flowchart illustrating a method of operating a semiconductor device according to an example embodiment of the present disclosure.

Referring to FIG. 12, the method includes receiving a video stream including a plurality of GOPs encoded in a hierarchical manner. The method further includes retrieving a first GOP that is the latest one of the plurality of GOPs (operation S1201).

The method further includes decoding some of the plurality of frames of the first GOP that are classified as the first layer L1 in chronological order (operation S1203).

The method further includes decoding the latest ones of the frames of each of the plurality of frames classified as upper layers (operation S1205). As used herein, the term "upper layers" refers to all layers other than the first layer.

The method further includes decoding the rest of the frames classified as each of the upper layers while traversing the frames in reverse chronological order (operation S1207). The method further includes retrieving a second GOP that is the second latest one of the plurality of GOPs (operation S1209), and performing encoding on the second GOP.

In the method of operating a semiconductor device and a semiconductor system according to various example embodiments of the present disclosure, at the time of reverse playback of an encoded video stream, the size of the DPB 200 is drastically reduced. In addition, at least some of the plurality of frames included in a GOP is displayed before all of the frames of the GOP are displayed, reducing display delay.

Figure 13:
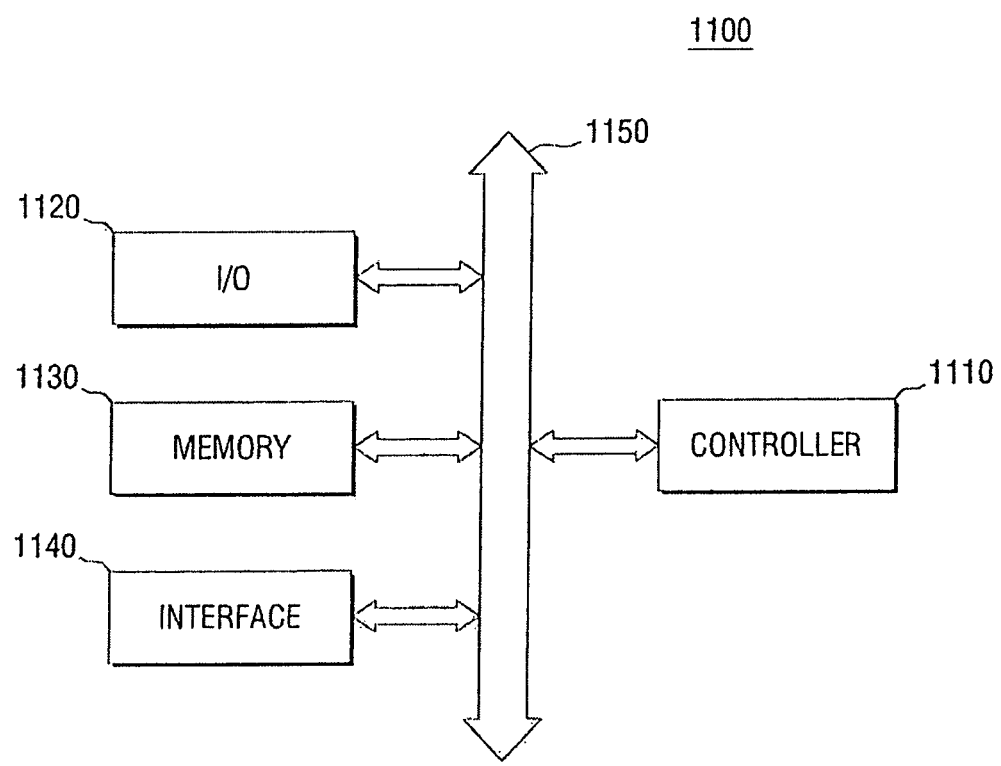
FIG. 13 is a block diagram of an electronic system that can employ the method of operating a semiconductor device and a semiconductor system according to any of the example embodiments of the present disclosure.

FIG. 13 is a block diagram of an electronic system that can employ the method of operating a semiconductor device and a semiconductor system according to any of the example embodiments of the present disclosure.

Referring to FIG. 13, the electronic system 1100 according to an example embodiment of the present disclosure may include a controller 1110, an input/output (I/O) device 1120, a memory device 1130, an interface 1140 and a bus 1150. The controller 1110, the I/O device 1120, the memory device 1130 and/or the interface 1140 may be connected to one another via the bus 1150. The bus 1150 may serve as a path via which data is transferred.

The controller 1110 may include at least one of, for example, a microprocessor, a digital signal processor, a microcontroller, and logic elements capable of performing similar functions. The I/O device 1120 may include, for example, a keypad, a keyboard, a display device, etc. The memory device 1130 may store, for example, data and/or instructions therein. The interface 1140 may be capable of transmitting/receiving data to/from a communication network. The interface 1140 may be a wired or wireless interface. For example, the interface 1140 may include an antenna, a wired/wireless transceiver, etc.

According to example embodiments of the present disclosure, the electronic system 1100 is an operational memory for improving the operation of the controller 1100, and may further include, for example, a high-speed DRAM and/or SRAM.

Additionally, the processor according to any of the example embodiments of the present disclosure may be provided in the memory device 1130 or may be provided as a part of the controller 1110, the I/O device 1120, etc.

The semiconductor system 1100 may be applied to, for example, a personal digital assistant (PDA), a portable computer, a web tablet, a wireless phone, a mobile phone, a digital music player, a memory card, or any electronic device capable of transmitting/receiving information in a wireless environment.

Figure 14:
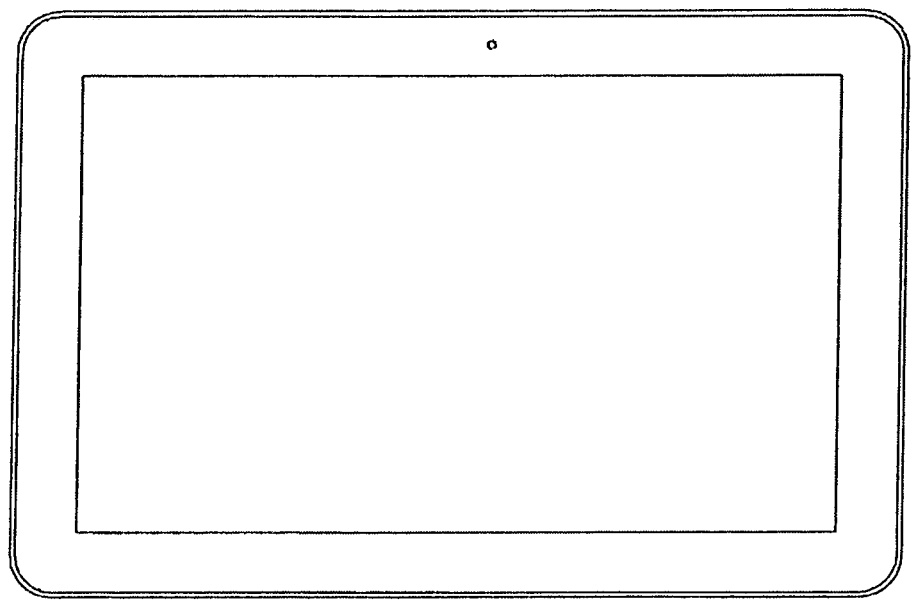
FIGS. 14 to 16 show examples of semiconductor systems that can employ the method of operating a semiconductor device according to example embodiments of the present disclosure.
Figure 15:
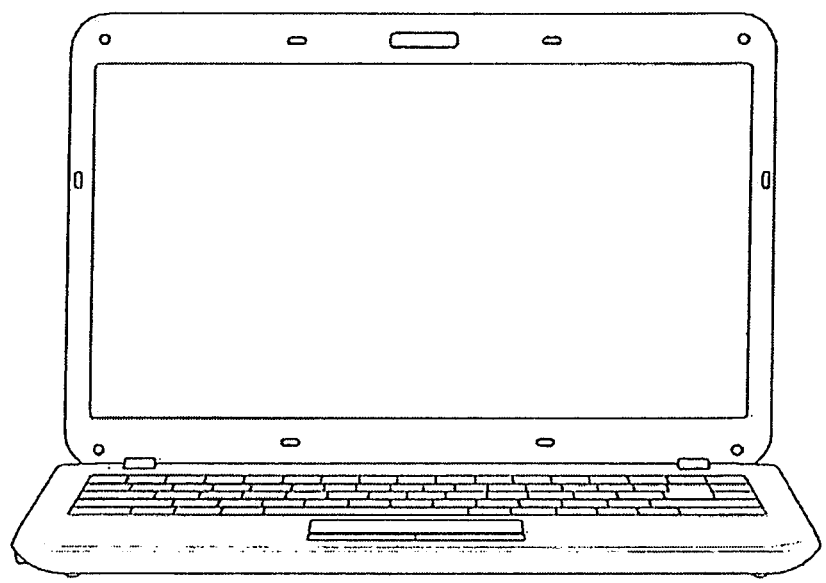
Figure 16:
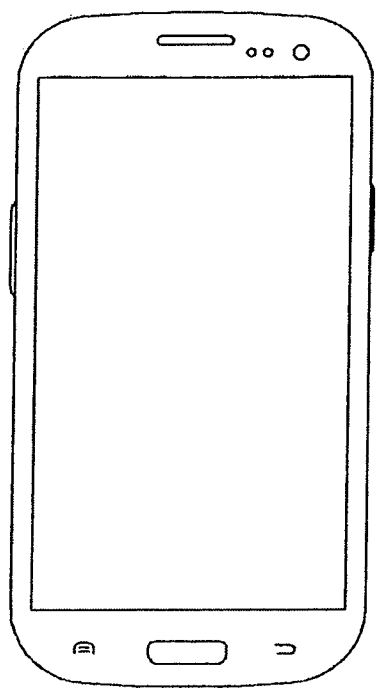

FIGS. 14 to 16 show examples of semiconductor systems that can employ the method of operating a semiconductor device according to example embodiments of the present disclosure.

FIG. 14 shows a tablet PC 1200, FIG. 15 shows a laptop computer 1300, and FIG. 16 shows a smartphone 1400. At least one of the processors according to the example embodiments of the present disclosure may be employed by the tablet PC 1200, the laptop computer 1300, the smartphone 1400, etc.

As will be appreciated by those skilled in the art, the semiconductor devices fabricated according to example embodiments of the present disclosure may be employed by integrated circuit devices other than those mentioned above. For example, although the tablet PC 1200, the laptop computer 1300 and the smartphone 1400 are described as examples of semiconductor systems that can employ the method of operating a semiconductor device according to example embodiments of the present disclosure, the examples of the semiconductor system are not limited thereto.

In example embodiments of the present disclosure, the semiconductor system may be implemented as, for example, a computer, an ultra mobile PC (UMPC), a workstation, a net-book, a PDA, a portable computer, a wireless phone, a mobile phone, an e-book, a portable multimedia player (PMP), a portable game console, a navigation device, a black box, a digital camera, a three-dimensional television, a digital audio recorder, a digital audio player, a digital picture recorder, a digital picture player, a digital video recorder, a digital video player, etc.

While the present inventive concept has been particularly shown and described with reference to the example embodiments thereof, it will be understood by those of ordinary skill in the art that various changes in form and detail may be made therein without departing from the spirit and scope of the present inventive concept as defined by the following claims.

What is claimed is:

1. A method of operating a semiconductor device, comprising:
    receiving a video stream comprising a first frame, a second frame, a third frame, and a fourth frame encoded in a hierarchical manner,
    wherein the first frame and the third frame are classified as a first layer, and the second frame and the fourth frame are classified as a second layer;
    wherein the first frame is a parent frame of the second frame, and the third frame is a parent frame of the fourth frame,
    wherein the first frame, the second frame, the third frame, and the fourth frame are in chronological order,
    decoding the first frame and the third frame in a chronological order;
    storing the decoded first frame and the decoded third frame in a decoded picture buffer (DPB) in chronological order;
    decoding the fourth frame;
    storing the decoded fourth frame in the DPB;
    displaying the fourth frame by reading the DPB;
    decoding the second frame after displaying the fourth frame; and
    overwriting the fourth frame in the DPB with the second frame after the fourth frame has been displayed.

2. The method of claim 1,
wherein the DPB comprises a plurality of unit buffer blocks, and each unit buffer block is associated with information on a respective frame,
wherein a number of the unit buffer blocks used for operation of the semiconductor device is determined by:

$$NB=NG/2^{\wedge}(NL-1)+NL,$$

wherein NB denotes the number of the unit buffer blocks used for operation of the semiconductor device, NG denotes a number of a plurality of frames included in the video stream, and NL denotes a number of a plurality of layers into which the plurality of frames is classified into.

3. The method of claim 2,
wherein a display delay taken in decoding a frame until the semiconductor device begins a display operation is determined by:

$$DD=NG/2^{\wedge}(NL-1)+NL-1,$$

wherein DD denotes the display delay.

4. The method of claim 1, wherein the first frame, the second frame, the third frame, and the fourth frame are displayed in reverse chronological order.

5. The method of claim 1, wherein the first frame, the second frame, the third frame, and the fourth frame comprises at least one of intra frames (I-frame), predicted frame (P-frames), and bidirectional prediction frames (B-frames).

6. The method of claim 1, wherein decoding and displaying the fourth frame comprises:
reading the DPB to retrieve the second frame; and
determining whether a hierarchical parent frame of the second frame is stored in the DPB.

7. The method of claim 6, wherein decoding and displaying the second frame comprises:
decoding the second frame when the hierarchical parent frame of the second frame is stored in the DPB.

8. The method of claim 6, wherein decoding and displaying the second frame comprises:
decoding the hierarchical parent frame of the second frame and subsequently decoding the second frame when the hierarchical parent frame is not stored in the DPB.

9. The method of claim 1, wherein the first layer and the second layer is determined when the first frame, the second frame, the third frame, and the fourth frame are encoded in the hierarchical manner.

10. A method of operating a semiconductor device, comprising:
receiving a video stream comprising a plurality of groups of pictures (GOPs) encoded in a hierarchical manner;
storing the video stream in a first memory area;
retrieving a first GOP that is a latest one of the plurality of GOPs from the video stream stored in the first memory area,
wherein the first GOP comprises a first frame, a second frame, a third frame, and a fourth frame,
wherein the first frame and the third frame are classified as a first layer, and the second frame and the fourth frame are classified as a second layer,
wherein the first frame is a parent frame of the second frame, and the third frame is a parent frame of the fourth frame,
wherein the first frame, the second frame, the third frame, and the fourth frame are in chronological order;
decoding the first frame and the third frame in chronological order;
storing the decoded first frame and the decoded third frame in a second memory area;
decoding the fourth frame;
storing the decoded fourth frame in the second memory area;
displaying the fourth frame by reading the second memory area;
decoding the second frame after displaying the fourth frame;
overwriting the fourth frame stored in the second memory area with the second frame after the fourth frame has been displayed; and
retrieving a second GOP that is a second latest one of the plurality of GOPs from the video stream stored in the first memory area.

11. The method of claim 10, wherein at least some of the first frame, the second frame, the third frame, and the fourth frame included in the first GOP are displayed before all of the frames of the first GOP are decoded.

12. The method of claim 10, wherein the first memory area comprises a buffer memory for storing the video stream, and the second memory area comprises a decoded picture buffer (DPB) for storing the decoded frames.

13. The method of claim 10,
wherein the second memory area comprises a plurality of unit buffer blocks, and each unit buffer block is associated with information on a respective frame,
wherein a number of the unit buffer blocks used for operation of the semiconductor device is determined by:

$$NB=NG/2^{\wedge}(NL-1)+NL,$$

wherein NB denotes the number of the unit buffer blocks used for operation of the semiconductor device, NG denotes a number of a plurality of frames included in the first GOP, and NL denotes a number of a plurality of layers into which the plurality of frames is classified into.

14. The method of claim 10, wherein the plurality of GOPs is displayed in the reverse chronological order.

15. The method of claim 10, wherein decoding the second frame and the fourth frame comprises:
reading the second memory area to retrieve the second frame; and
determining whether a hierarchical parent frame of the second frame is stored in the second memory area.

16. The method of claim 15, wherein decoding the second frame further comprises:
decoding the second frame when the hierarchical parent frame of the second frame is stored in the second memory area.

17. The method of claim 15, wherein decoding the second frame further comprises:
decoding the hierarchical parent frame of the second frame and subsequently decoding the second frame when the hierarchical parent frame is not stored in the second memory area.

18. A method of operating a semiconductor device, comprising:
receiving a video stream comprising a first frame, a second frame, a third frame, a fourth frame, a fifth frame, and a sixth frame encoded in a hierarchical manner,
wherein the first frame and the third frame are classified as a first layer, the second frame and the fourth frame are classified as a second layer, and the fifth frame and the sixth frame are classified as a third layer, wherein the first frame, the second frame, the third frame, the fourth frame, the fifth frame, and the sixth frame are in chronological order, wherein the first frame is a parent frame of the second frame, the third frame is a parent frame of the fourth frame, the second frame is a parent frame of the fifth frame, and the fourth frame is a parent frame of the sixth frame;

decoding the first frame and the third frame in chronological order;

storing the decoded first frame and the decoded third frame in a decoded picture buffer (DPB) in chronological order;

decoding the second frame and the fourth frame;

storing the decoded second frame and the decoded fourth frame in the DPB;

decoding the sixth frame;

storing the decoded sixth frame in the DPB;

retrieving the fifth frame;

determining whether the second frame, a hierarchical parent frame of the fifth frame, is stored in the DPB;

decoding the fifth frame when the second frame is stored in the DPB; and decoding the hierarchical parent frame, and subsequently decoding the second frame and storing the second frame in the DPB, when the second frame is not stored in the DPB, wherein the second frame overwrites the sixth frame stored in the DPB upon being decoded and after the sixth frame has been displayed.

19. The method of claim 18, wherein the DPB comprises a plurality of unit buffer blocks, and each unit buffer block is associated with information on a respective frame, wherein a number of the unit buffer blocks used for operation of the semiconductor device is determined by:

$$NB=NG/2^{\wedge}(NL-1)+NL,$$

wherein NB denotes the number of the unit buffer blocks, NG denotes a number of a plurality of frames included in the video stream, and NL denotes a number of a plurality of layers into which the plurality of frames is classified into.

20. The method of claim 1, wherein the DPB comprises a first buffer area and a second buffer area, wherein the first buffer area stores a decoded frame from among the first frame, the second frame, the third frame, and the fourth frame, and the second buffer area stores a frame for displaying from among the decoded frames.

* * * * *